Patented June 20, 1933

1,914,557

UNITED STATES PATENT OFFICE

AUGUSTUS E. CRAVER, OF PHILADELPHIA, PENNSYLVANIA, ASSIGNOR TO THE BARRETT COMPANY, OF NEW YORK, N. Y., A CORPORATION OF NEW JERSEY

CATALYST AND PROCESS OF PREPARING THE SAME

No Drawing. Continuation of application Serial No. 513,111, filed November 5, 1921. This application filed February 4, 1929. Serial No. 337,522.

This invention relates to catalysts and to methods of producing same. As is well known, a great many different metals and their oxides are employed to catalyze various reactions, the choice of the catalyst being dependent more or less on the type of catalysis and also to a less extent on the particular reaction in question.

For example, catalytic hydrogenation, including such processes as the hardening of unsaturated oils, the hydrogenation of aromatic and aliphatic compounds, and the production of alcohols from aldehydes, can be brought about by the use of nickel, cobalt, iron and copper; catalytic oxidation, including such processes as the production of sulfuric acid, benzaldehyde from toluene, phthalic anhydride from naphthalene, nitric acid from ammonia, and acetic acid from acetaldehyde, can be accomplished by employing such oxides as those of uranium, molybdenum, tungsten, manganese, bismuth, vanadium, cerium, nickel, etc., while for catalytic dehydration, including the production of acetone from acetic acid, ethylene from ethyl alcohol, and also the production of esters, as for example, ethyl benzoate and ethyl acetate from a mixture of an acid and an alcohol, of ethers such as ethyl ether from ethyl alcohol, and phenyl ether from phenol, and amines from a mixture of an alcohol and ammonia, the most highly recommended catalysts are the oxides of thorium, aluminum, titanium, tungsten, chromium, beryllium, zirconium and bismuth. This specification particularly applies to the preparation of these various catalysts.

In the usual method of preparing catalysts, a solution of a salt of a metal, whose oxide is to serve as the catalyst, is evaporated to dryness in the presence of a carrier or catalytic support, after which the dried coating is ignited at a suitable temperature, in the presence of a suitable gas, whereby a decomposition of the compound ensues, part volatilizing and the residue remaining behind in the form of an oxide, or in some cases, in the form of the metal, if proper reducing gases are employed in the ignition.

For the successful preparation of a metallic oxide catalyst for example, the metallic compound to be selected should possess certain essential properties which are as follows: (1) The salt should possess considerable solubility in water, (2) the salt should possess the property of clinging to the surface of the carrier and also of giving an oxide on ignition which likewise holds tenaciously to the carrier, thus insuring a good uniform and continuous coating, (3) the salt should be decomposable at a temperature below the sintering temperature of the resulting oxide, (4) the ignition of the salt should be readily accomplished and it should be complete, thus insuring the absence of injurious impurities in the resulting oxide, (5) the salt should be of such a nature that when it undergoes decomposition, the resultant oxide remains behind in a highly active condition.

Of the properties mentioned above, the second is undoubtedly one of great importance, as many salts that are otherwise suitable lack the property of forming an adherent, uniform coating on the carrier and also of the ignited oxide on the carrier. To obtain this condition many expedients are sometimes resorted to, such as the addition of glue, gelatin, pitch, glucose, sugar, gum arabic, and other sticky, gummy or peptonizing materials to the salt during the evaporation. The disadvantages of adding such extraneous materials are manifest, for they frequently introduce foreign matter in the form of ash and other impurities and on ignition form particles of carbon which are burned out only with difficulty. Frequently these extraneous materials defeat their purpose by fusing and puffing up during the ignition. Their chief disadvantage is that they are not chemically united with the metal but simply admixed with it, for which reason the desired adherence is usually only partially realized.

By my procedure, however, I produce certain complex combinations of metals and organic acids, mixed or unmixed with other materials, which complex combinations will hereinafter be designated as "metallic-organo complexes." These complexes purely by their nature alone, obviate the necessity of adding extraneous materials to produce this desirable ability to adhere or property of adhering to the catalyst support, and in addition possess the other desirable properties referred to above. I will first illustrate the superiority and mechanism of my method of catalyst preparation by describing the preparation of a vanadium oxide catalyst and will then give further examples illustrating the invention.

Vanadium oxide as heretofore prepared by the evaporation of an aqueous solution of ammonium metavanadate with or without a carrier possesses considerable disadvantages and entails many difficulties, which are always more or less true of the usual methods of preparing other oxide catalysts. Among the objections to the vanadium oxide catalyst thus prepared may be mentioned the poor adherence of the resulting vanadium oxide coating to the carrier which limits the number of suitable carriers which may be employed; ammonium metavanadate, the starting material, is only slightly soluble in water, necessitating the use of excessively large volumes, the evaporation of which is time-consuming and also causes the salt to crystallize out on the carrier from solution soon after the start of the evaporation and also the catalyst thus prepared requires a high reaction temperature for the catalytic process in order to give it the desired productivity.

By my process, however, a vanadium oxide catalyst for example, as well as other catalysts, are prepared, which possess not only greater activity and a very much greater and uniform adherence of the oxide coating to the carrier, thus permitting them to withstand much handling with practically no dusting, but in addition the entire process of catalyst preparation is simplified, expedited, and rendered more positive.

I have discovered that when ammonium metavanadate or vanadium pentoxide or other similar vanadium compound is chemically altered by a suitable procedure or treated with proper reagents, the resulting vanadium compound is capable of uniting with various organic acids to form soluble, sticky substances, the so-called "metallic-organo complexes" mentioned previously, which possess the combination of highly desirable properties requisite for the successful and convenient preparation of catalysts.

I have found that many compounds and incidentally many different procedures can be employed for effecting the formation of these substances or complexes. For example, it is possible to use such acids as oxalic, citric, tartaric and malic with vanadium pentoxide or ammonium metavanadate without isolating or especially preparing a reduced vanadium oxide. Also, vanadium tetroxide may be obtained from vanadium pentoxide or ammonium metavanadate by controlled fusion with oxalic acid, ammonium oxalate or by ignition in the presence of ammonia, hydrocarbons, carbon monoxide or by treatment in the wet way with sulphur dioxide, oxalic acid, glucose or alcohol, and made to react with certain acids such as formic, acetic, oxalic, maleic, malic, citric, tartaric and the like.

The chemistry connected with the formation of these complexes is very obscure, but in an attempt to throw some light on this phase of my invention I shall give the reactions which seem to me to occur when ammonium metavanadate is acted upon by oxalic acid, this reaction being selected because of its relative simplicity when compared with the reactions with acids such as malic and citric. Ammonium metavanadate appears to react with oxalic acid in the following step-wise manner:

(1) $2NH_4VO_3 + 2H_2C_2O_4 = 2HVO_3 + 2NH_4HC_2O_4$
(2) $2HVO_3 + H_2C_2O_4 = V_2O_4 + 2CO_2 + 2H_2O$
(3) $V_2O_4 + H_2C_2O_4 + 2NH_4HC_2O_4 =$
$(NH_4)_2C_2O_4.2VO.C_2O_4 + 2H_2O$

Thus the final product appears to be ammonium divanadyl oxalate and is a typical "metallic-organo complex" and is the vanadium compound, a solution of which can be used in the preparation of an improved vanadium oxide catalyst. It possesses an extremely great solubility in water, and is stable at the temperature of boiling water, but begins to decompose at slightly more elevated temperatures, which decomposition continues over a range of about 150° C., which long range prevents the vanadium oxide from being detached from the carrier during the ignition. On evaporation it has the peculiar property of forming an intensely sticky syrupy solution which finally dries to a glass-like amorphous greenish mass. It is this sticky property which helps to make this vanadium-containing substance such a desirable material for catalyst preparation as it clings to the carrier, thus obviating the flaking and dusting off of the coating, and also gives an adherent oxide coating even after ignition. A sticky vanadium compound has thus been prepared without the ineffectual and cumbersome addition of extraneous sticky materials. This compound has also the property of developing, when heated, a large quantity of gas, approximately 60% of the compound by weight, which forms a porous mass during the ignition, and the resultant vanadium oxide is of increased catalytic activity when compared with the catalysts prepared by evaporation of ammonium metavanadate solutions. Furthermore, a very adherent and uniform vanadium oxide coating has thus also been obtained in the finished catalyst without fusing or sintering the vanadium oxide.

The following specific examples will serve to illustrate further methods of preparing my catalysts. In all of these examples my work indicates that there is the formation of the desirable "metallic-organo complexes", these being largely characterized by stability at 100° C., ready decomposability by heat, large solubility and the formation on evaporation of sticky, amorphous masses. These examples also show the large range that exists in the choice of materials and procedures in effecting the formation of these complexes. It is the intention not to be limited to these particular examples.

The solution of these "metallic-organo complexes" is suitable for the coating or impregnation of granular or irregularly shaped carriers, such as asbestos, crushed pumice, etc. Furthermore, they lend themselves very readily by varying the consistency of the solution to suit the requirements by changing the amount of solvent used, such for example as water, to the coating of all kinds of continuous and discontinuous surfaces and forms, such as tubes, rods, plates, gauzes and balls of various materials and the like, which coatings, on ignition, leave a very adherent and uniform coating of the catalytic material. Molded catalytic forms can also be made by making a paste, mixed or unmixed with various inert materials, from a syrupy solution of these "metallic-organo complexes" followed by a subsequent baking and ignition. By igniting a mass of the "metallic-organo complexes" a very fine catalyst may be obtained. By the proper selection of the gas or gas mixture during the ignition, various oxides representing varying degrees of oxidation can be formed with some of the metals, such as vanadium, tungsten, molybdenum, manganese, etc., or in the case of other metals, more particularly nickel, iron, cobalt, silver and copper, the metal itself may be produced.

In all of these applications of the "metallic-organo complexes" for the production of catalyst or catalyst coatings, the ignition is intended not to mean a sintering or fusion of the catalytic material, as the temperature of the ignition is purposely kept as low as possible. Of course, if desired, a sintered or fused catalyst can be prepared from these "metallic-organo complexes".

The relative ease with which these "metallic-organo complexes" decompose on ignition, and yet at the same time are able to give an adherent and uniform coating of the catalyst material on the catalytic support if such be used, constitutes a decided advantage over the usual compounds employed in the customary methods of catalyst preparation, as it is a well known fact to those skilled in the art of catalysis that a catalyst ignited at a low temperature is usually more active than one ignited at a higher temperature.

*Example 1.—Vanadium oxide catalyst.—* Make a paste of 21 parts of ammonium metavanadate and 15 parts of water and heat on a steam bath. 34 parts of oxalic acid are then gradually added to the paste and the heating continued until the evolution of carbon dioxide has subsided, after which 8.5 parts of concentrated ammonium hydroxide are added. The resulting solution is then ready to be used in the catalyst preparation and the desired carrier added, after which the whole is evaporated to dryness while stirred. The coated catalyst is then ignited in the presence of air or air containing gas, inert or reducing gases, the choice of which depends on the particular oxide desired.

*Example 2.—Vanadium oxide catalyst.—* Dissolve 41 parts of malic acid in 160 parts of water and heat almost to boiling, after which 50 parts of ammonium metavanadate are added gradually while stirring. After heating for a short time, 20 parts of concentrated ammonium hydroxide are added and the heating continued for a few minutes longer. A clear deep blue solution is thus obtained to which the carrier is added and the remainder of the catalyst preparation completed as described above.

*Example 3.—Vanadium oxide catalyst.—* Dissolve 25 parts of citric acid in 70 parts of water and heat to boiling, after which 20 parts of vanadium tetroxide are added very gradually. Heating is continued until the solution of the oxide has been completed, after which 20 parts of concentrated ammonium hydroxide are added. The solution now contains the vanadium "metallic-organo complex" in a form very suitable for the preparation of catalyst. On evaporation a very dark blue, sticky, amorphous mass is obtained.

*Example 4.—Uranium oxide catalyst.—* Add 10 parts of uranium oxide to a solution of 5 parts of malic acid in 70 parts of water and heat on a steam bath until complete solution is effected, after which 1.5 parts of concentrated ammonium hydroxide are to be added. The solution contains the "metallic-organo complex" of uranium which is very soluble, sticky and of a greenish yellow color. A solution of this compound in the desired concentration per unit weight of carrier is ready for the addition of the carrier and subsequent evaporation and ignition.

*Example 5.—Ferric oxide catalyst.—* Prepare a paste of pure ferrous carbonate with water, warm, and add ammonium acid malate in small quantities at a time and in sufficient quantity to just dissolve the ferrous salt, while heated on a steam bath. The resulting solution is then ready to be used as the coating or impregnating material, which on evaporation leaves a reddish brown sticky mass.

*Example 6.—Nickel oxide catalyst.*—11.5 parts of crystallized nickel nitrate are made alkaline with sodium hydroxide and the filtered and washed nickel hydroxide is dissolved in 8 parts of malic acid contained in 125 parts of water. The carrier can now be added to this solution and evaporated to dryness. The complex nickel compound in this case consists of a very soluble green, amorphous, sticky mass.

*Example 7.—Molybdenum oxide catalyst.*—Fuse 7 parts of ammonium molybdate with a mixture of 4 parts of malic acid and 3 parts of water at 135–145° C. for about 30 minutes, after which the melt is allowed to cool and added finally to 50 c. c. of water, the latter being heated almost to boiling. After complete solution the carrier can be added and the whole evaporated to dryness and ignited. A greenish colored very sticky mass is obtained which serves very well in the catalyst preparation.

*Example 8.—Tungsten oxide catalyst.*—Dissolve 20 parts of ammonium tungstate in 7 parts of sodium hydroxide contained in 20 parts of water. A slight excess of hot concentrated nitric acid is then added and the precipitated tungstic acid, after rapid filtration and washing, is dissolved in a hot solution of 16 parts di-ammonium malate contained in 135 parts of water. The carrier is then added followed by evaporation and ignition.

*Example 9.—Chromium oxide catalyst.*—A chromic oxide catalyst may be prepared by slowly adding chromium hydroxide freshly prepared from 19 parts of crystallized chrom alum to 5.4 parts of malic acid contained in 50 parts of water. Most of the hydroxide is thereby dissolved and the remainder goes into solution when a slight excess of concentrated ammonium hydroxide is added. A carrier can now be added and the whole evaporated and finally ignited. The chromium "metallic-organo complex" is green in color and is very soluble and sticky.

*Example 10.—Manganese oxide catalyst.*—A manganese oxide catalyst can be prepared by reducing 3.5 parts of manganese dioxide to the manganous condition and precipitating the hydroxide. Dissolve the filtered and washed hydroxide in a hot solution of 5.4 parts of malic acid in 50 parts of water to which concentrated ammonium hydroxide has been added almost to the neutralization point. The carrier is then added and the evaporation and ignition completed. The manganese complex is amber colored and on evaporation forms a soluble, very stick mass.

*Example 11.—Tin oxide catalyst.*—Dissolve 9 parts of stannous chloride in water and add ammonium hydroxide until the precipitation of stannous hydroxide is complete. The filtered and washed stannous hydroxide is then added to a hot solution of 12 parts of citric acid contained in 100 parts of water, to which concentrated ammonium hydroxide has been added to almost the neutralization point. The carrier is then added and the whole evaporated to dryness while stirred, after which it is ignited.

*Example 12.—Aluminum oxide catalyst.*—Precipitate aluminum hydroxide from 4 parts of crystallized aluminum acetate by ammonium hydroxide in the hot, and after filtration and washing dissolve it in 3.5 parts of tartaric acid contained in 60 parts of water, after which concentrated ammonium hydroxide is added almost to the neutralization point. The aluminum complex on evaporation forms a very soluble, sticky mass and is well suited for the preparation of catalyst, which is accomplished by adding the carrier to a solution of this compound followed by evaporation and ignition. Investigation of the structure of this complex indicates that it has either of the following two configurations

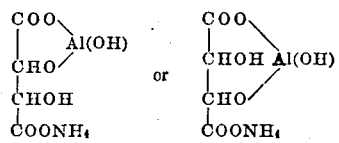

which form seems to be typical of the "metallic-organo complexes" arising from the oxy-carboxylic acids.

*Example 13.—Cobalt oxide catalyst.*—Dissolve 11.5 parts of crystallized cobalt nitrate in water and add a slight excess of sodium hydroxide, following by gentle heating. The precipitated hydroxide, after filtration and washing, is then dissolved in 5.5 parts of malic acid contained in 75 parts of water, the solution being facilitated by heating. The carrier is then added and the catalyst preparation completed as usual. The cobalt complex has a pink color, is very soluble in water and sticky.

*Example 14.—Copper oxide catalyst.*—Dissolve 1 part of freshly prepared cupric hydroxide in 2.1 parts of citric acid, contained in 4 parts of water, by warming the mixture. Concentrated ammonium hydroxide is then added to this mixture in an amount just insufficient to prevent the solution assuming the blue color characteristic of ammoniacal copper solutions. The solution is now ready for the carrier, after which it is evaporated and the catalyst ignited. The copper complex has a pale blue color and forms a sticky, very soluble mass.

*Example 15.—Lead oxide catalyst.*—Dissolve 8 parts of freshly prepared lead carbonate in 14 parts malic acid contained in 60 parts of water; heating facilitates the solution of the lead compound. Concentrated ammonium hydroxide is then added to the clear solution until the neutralization point is almost reached. The lead complex forms a very soluble, sticky, glossy, transparent mass. The carrier is added, followed by evaporation and ignition. A very desirable lead complex can also be formed by adding 4.8 parts of crystallized lead acetate to 2.2 parts of butyric acid and using this resulting mixture in the preparation of the lead oxide catalyst. This solution on evaporation leaves an intensely gummy soluble, transparent mass.

Example 16.—Titanium oxide catalyst.—Dissolve 10 parts of crystallized titanium oxalate in water and precipitate the hydroxide. After filtration and washing of the latter it is added to 6.2 parts of tartaric acid contained in 70 parts of water containing a very slight excess of ammonia, and heated at near the boiling point for a long time. A slightly turbid solution is thus obtained, but on evaporation it yields a very soluble, water-white sticky, varnish-like mass. The carrier is added to the solution of this salt and the evaporation and ignition completed.

Example 17.—Thorium oxide catalyst.—Dissolve 7 parts of thorium nitrate in a small quantity of water and precipitate the hydroxide, which is subsequently dissolved in 10 parts of malic acid contained in 60 parts of water. This mixture is then heated at the boiling point for a long time, after which a slight excess of ammonium hydroxide is added. On evaporation a sticky, water-white transparent mass is obtained which serves very well as the starting material for the preparation of thorium oxide catalysts.

Example 18.—Zinc oxide catalyst.—4 parts of crystalline zinc acetate is dissolved in water, the carbonate is preciptated and the precipitate is added to 2.6 parts of succinic acid contained in 50 parts of hot water. Most of the hydroxide is dissolved and the solution is completed by the careful addition of concentrated ammonium hydroxide. On evaporation this solution forms a gummy, transparent mass. Tartaric acid can also be employed in lieu of succinic, in which case zinc tartrate is precipitated and dissolved in a slight excess of ammonum hydroxide. This solution can also be used for preparing zinc oxide catalysts. The carrier is then added and the preparation completed.

Example 19.—Cadmium oxide catalyst.—Dissolve 4 parts of crystalline cadmium chloride in a small quantity of water and precipitate the hydroxide, which is then dissolved in 3 parts of malic acid contained in 60 parts of hot water, to which concentrated ammonium hydroxide is then added to the neutralization point. The cadmium complex on evaporation forms a soluble amorphous glass-like mass. The carrier is added to a solution of this material and the preparation of the catalyst completed as usual.

Example 20.—Zirconium oxide catalyst.—Prepare zirconium tartrate by adding a dilute solution of tartaric acid to a strong zirconium chloride solution. The precipitated zirconium tartrate is boiled up with a small quantity of water, to which a slight excess of concentrated ammonium hydroxide is added, whereby complete solution is effected. The carrier is added to this solution and the preparation of the catalyst continued as usual.

Example 21.—Cerium oxide catalyst.—Dissolve 4 parts of crystallized cerium nitrate in a small quantity of water and precipitate cerium hydroxide. After filtering and washing the latter, it is dissolved by heating it with 4 parts of malic acid in 50 parts of water and adding ammonia after 20 minutes boiling to almost the neutralization point. The resulting compound is very soluble in water and gives a sticky, transparent mass on evaporation. The carrier is added to a solution of this material and the catalyst preparation continued as usual.

Example 22.—Tantalum oxide catalyst.—Dissolve 2 parts of tantalum potassium fluoride in water and gradually add $NH_4OH$ until the precipitation of tantalic acid is completed, which, after filtration and washing, is added to 6 parts of citric acid contained in 50 parts of water. The solution is boiled for 30 minutes, after which it is ready for the addition of the carrier.

Example 23.—Silver oxide catalyst.—Dissolve 20 parts of silver nitrate in water and warm to about 60° C. A dilute sodium hydroxide solution is then added gradually until all the silver has been precipitated. After filtration and washing, the silver oxide is added to a hot solution of 16 parts of malic acid in 80 parts of water. 20 parts of concentrated ammonium hydroxide are then finally added and the mass heated for about 10 minutes. The carrier is added to this solution and the catalyst preparation completed. By controlling the temperature of the ignition, and with the employment of a suitable gas, either metallic silver or silver oxide can be obtained.

Example 24.—Antimony oxide catalyst.—Gradually add 10 parts of freshly prepared antimony trioxide to 10 parts of ammonium acid malate contained in 60 parts of hot water. The mass is then boiled until all of the oxide has disappeared. An antimony complex is hereby formed which on evaporation gives a transparent, sticky mass and acts very well in the preparation of antimony oxide catalysts.

These above "metallic-organo complexes" are seen to possess properties which make their use as the starting materials for the preparation of catalysts of considerable advantage over the inorganic metallic salts ordinarily employed in catalyst preparation; they are all very soluble, stable at temperatures of 100° C. but readily decomposable at slightly more elevated temperatures giving rise to uncommonly large gas evolutions per unit weight, thereby forming porous catalytic materials, and they are of such a nature that the catalytic coating will cling tenaciously to the carrier.

A number of specific examples for the preparation of superior catalysts have thus been given, but I intend not to limit myself to the materials or their quantities and the procedures given above, as these are merely representative of the methods I employ in forming these desirable catalyst compounds. It is also evident that the ignition of these "metallic-organo complexes" may be varied so as to obtain different oxides or the metals themselves; that is, they may be ignited in the presence of an oxygen, hydrogen, nitrogen, $CO_2$, or other suitable gas, or in the presence of the materials that are to be subjected to catalysis.

I have also found that binary and ternary mixtures of oxides can be prepared very conveniently and efficiently by employing mixtures of different "metallic-organo complexes". This procedure has important advantages over the usual methods of forming mixtures, in which mixtures of metallic inorganic salts or the oxides themselves in a suspended condition are employed, in that there is no fractional crystallization during the evaporation, no incompatible mixtures of the salts to form precipitates, and furthermore the component metallic oxides or metals of the mixtures prepared by the method are very intimately mixed, probably of molecular intimacy, due to the chemical nature of the "metallic-organo complexes", as it is believed that the metals of the mixture are united together in the same molecule. The following examples will serve to illustrate the preparation of mixed catalysts, but it is the intention not to be limited to these specific preparations or to the choice of materials contained therein.

*Example 25.—Vanadium and tin oxide mixed catalyst.*—Dissolve 36 parts of malic acid in 100 parts of water, to which solution are added 44 parts of ammonium metavanadate. The mixture should then be heated for a short time, after which 18 parts of concentrated ammonium hydroxide are added. A clear deep blue solution is thus obtained. Ammonium hydroxide is added to an aqueous solution of 3 parts of stannous chloride. After filtering and washing, the stannous hydroxide thus precipitated is then added to the solution of the vanadium "metallic-organo complex", just described, and heated. A complete solution is soon obtained, to which is added the carrier, and the whole mass is evaporated on a steam bath while being stirred. The remainder of the preparation of the mixed catalyst is completed as described in the previous examples.

*Example 26.—Uranium copper molybdenum oxide mixed catalyst.*—Dissolve 175 parts of uranyl nitrate in water and precipitate ammonium uranate therefrom by the addition of ammonium hydroxide. After filtration and washing with water, the ammonium uranate is added to 200 parts of water containing 47 parts of malic acid and heated for a short time, after which ammonium hydroxide is added in excess. The mixture is boiled until most of the ammonia has been expelled. 10 parts of ammonium molybdate are added to 100 parts of water containing 6 parts of malic acid and 5 parts of concentrated ammonium hydroxide and the mixture is heated until complete solution is obtained. Cupric hydroxide obtained by adding sodium hydroxide to a warm aqueous solution of 18 parts of copper sulfate is then gradually added to the solution of molybdenum "metallic-organo complex" just described and the mixture is heated until a complete solution is obtained, after which it is added to the solution of the uranium "metallic-organo complex". The solution thus obtained is now ready to be employed in the catalyst preparation. On evaporation, it forms a bright green, sticky mass.

This application is a continuation of my co-pending application, Serial Number 513,111 which was filed November 5, 1921, and the invention described herein is related to that described and claimed in my co-pending application, Serial No. 337,523 filed of even date herewith.

I claim:

1. In the production of a catalyst containing a metal, the process which comprises forming a soluble metallic-organo product by reacting a chemical compound containing a metal included in the fifth and sixth groups of the periodic system with a chemical compound containing an acid radical of an organic carboxylic acid in the presence of water, adding ammonia and evaporating the mixture until a sticky, amorphous product is obtained.

2. In the production of a catalyst containing a metal, a process which comprises forming a soluble metallic-organo product by reacting a chemical compound containing a metal included in the fifth and sixth groups of the periodic system with an aliphatic carboxylic acid in the presence of water, adding ammonia and evaporating the mixture until a sticky, amorphous product is obtained.

3. In the production of a catalyst containing a metal, a process which comprises forming a soluble metallic-organo complex by reacting a chemical compound containing the metal with a chemical compound containing an acid radical of an aliphatic dicarboxylic acid in the presence of water, adding ammonia and evaporating the mixture until a sticky, amorphous product is obtained.

4. In the production of a catalyst containing a metal, a process which comprises forming a soluble metallic-organo complex by reacting a chemical compound containing the metal with a chemical compound containing an acid radical of an organic carboxylic acid in the presence of water, adding ammonia and evaporating the mixture until a sticky, amorphous product is obtained, and subsequently drying and igniting the resultant product.

5. In the production of a catalyst containing a metal, a process which comprises forming a soluble metallic-organo product by reacting an ammonium compound containing a metal included in the fifth and sixth groups of the periodic system with an aliphatic carboxylic acid in the presence of water and evaporating the mixture until a sticky, amorphous product is obtained, and subsequently drying and igniting the resultant product.

6. In the production of a catalyst containing a metal, a process which comprises forming a soluble metallic-organo complex by reacting a chemical compound containing the metal with a chemical compound containing an acid radical of an organic carboxylic acid in the presence of water, adding an excess of aqueous ammonia and evaporating the mixture until a sticky, amorphous product is obtained, subsequently drying the resultant product and then igniting it in the presence of an oxygen containing gas.

7. In the process of producing a catalyst containing a metal, the steps which comprise reacting a chemical compound containing the metal, a chemical compound containing an organic carboxylic acid radical and ammonia, and igniting the resulting product in the presence of a gas mixture that is to be subjected to catalysis.

8. In the production of a catalyst containing a metal, a process which comprises forming a soluble metallic-organo complex on a catalyst carried by reacting an ammonium compound containing a metal with an aqueous solution of a chemical compound containing an acid radical of an aliphatic polycarboxylic acid in the presence of water and evaporating the mixture, with stirring, in the presence of a catalyst carrier, until a sticky, amorphous coating is obtained, and subsequently drying the resulting mass and igniting it at a temperature below the sintering temperature of the resulting oxide.

9. In the process of producing a catalyst containing a metal, the steps which comprise reacting a chemical compound containing vanadium with a chemical compound containing an organic carboxylic acid radical, heating the reaction product with ammonia, and igniting the resulting product.

10. In the process of producing a catalyst containing a metal, the steps which comprise reacting a mixture of chemical compounds containing a metal included in the fifth and sixth groups of the periodic system and a different metal with a chemical compound containing an organic carboxylic acid radical, and igniting the resulting product.

11. In the process of producing a catalyst containing a metal, the steps which comprise treating a mixture of chemical compounds containing vanadium and a different metal with a chemical compound containing an organic carboxylic acid radical, and igniting the resulting product.

12. In the production of a catalyst containing a metal, a process which comprises forming a soluble metallic-organo complex by reacting a chemical compound containing a metal with a chemical compound containing an acid radical of an aliphatic carboxylic acid in the presence of water, adding ammonia and evaporating the mixture until a sticky, amorphous product is obtained, subsequently drying the resulting product and subjecting it to thermal decomposition by the action of heat in the presence of an oxygen-containing gas at a temperature below the sintering temperature of the resulting oxide.

13. In the production of a catalyst containing a metal, a process which comprises forming a soluble metallic-organo complex by reacting an ammonium compound containing a metal with a chemical compound containing an acid radical of an aliphatic dicarboxylic acid in the presence of water, adding an excess of aqueous ammonia and evaporating the mixture until a sticky, amorphous product is obtained, and subsequently drying the resulting product to a glass-like, amorphous body.

14. In the process of producing a catalyst containing a metal, the steps which comprise reacting a chemical compound containing the metal with oxalic acid, reacting the resulting product with aqueous ammonia to produce a metallic-organo complex in solution, evaporating the resulting solution to dryness and igniting the resulting product at a temperature below the sintering temperature of the resulting oxide.

15. In the production of a catalyst containing a metal, a process which comprises subjecting a soluble, sticky, amorphous metallic-organo complex containing ammonia in its composition to thermal decomposition in contact with a catalyst carrier.

16. As an article of manufacture, a porous, adherent amorphous catalyst containing a metallic element and obtained by drying and igniting a soluble, sticky, amorphous metallic-organo complex.

17. As an article of manufacture, a glass-like intermediate catalytic material containing a metallic element and obtained by drying a soluble, sticky, amorphous metallic-organo complex.

18. As an article of manufacture, an adherent catalyst containing vanadium and obtained by igniting a metallic-organo complex containing vanadium.

19. As an article of manufacture, an adherent catalyst containing a metallic element and obtained by igniting a metallic-organo complex containing more than one metal.

20. As an article of manufacture, an adherent catalyst containing a metallic element and obtained by igniting a metallic-organo complex containing a metal included in the fifth and sixth groups of the periodic system and a metal outside of those groups.

21. As an article of manufacture, an adherent catalyst containing a metallic element and obtained by igniting a metallic-organo complex containing vanadium and another metal.

22. A composition of matter comprising a catalyst carrier associated with a soluble, sticky, amorphous metallic-organo complex, stable at 100° C. which dries to a glass-like amorphous mass and which upon thermal decomposition is converted to a porous, catalytic body.

23. The process which comprises coating a catalyst carrier with a sticky, amorphous metallic-organo complex containing ammonia in its composition, and subsequently drying and thermally decomposing the metallic-organo complex coating upon the catalyst carrier in the catalytic chamber in which the catalyst so produced is to be employed.

24. The process which comprises heating ammonium metavanadate at approximately 100° C. with oxalic acid, dissolving the resulting product in ammonium hydroxide and evaporating to dryness.

25. The process which comprises forming a solution of ammonium divanadyl oxalate in an aqueous medium, evaporating the solution to dryness and igniting the resulting product.

26. A soluble, sticky, amorphous metallic-organo complex derived by reacting a compound containing a metal in combination with an acid radical of an organic polycarboxylic acid with aqueous ammonia to form a solution, and evaporating the resulting solution.

27. In the production of a catalyst containing a metal, a process which comprises forming a soluble, sticky, amorphous metallic-organo complex by treating a chemical compound containing a metal with a chemical compound containing an acid radical of an organic carboxylic acid in the presence of water, adding ammonia, and evaporating the mixture.

28. In the production of a catalyst containing a metal, a process which comprises forming a metallic-organo complex by reacting a compound containing a metal in combination with an acid radical of an organic polycarboxylic acid with aqueous ammonia to form a solution, and evaporating the solution to dryness.

29. A composition of matter comprising a catalyst carrier associated with a metallic-organo complex containing ammonia, a metal and an acid radical of an organic carboxylic acid in chemical combination, and which, when heated, is decomposed into a porous catalyst.

30. In the process of producing a catalyst containing a metal, the steps which comprise reacting a chemical compound containing the metal, an aliphatic polycarboxylic acid and ammonia, and igniting the resulting product in the presence of a gas mixture that is to be subjected to catalysis.

31. In the process of producing a catalyst containing a metal, the steps which comprise reacting a chemical compound containing a metal included in the fifth and sixth groups of the periodic system, oxalic acid and ammonia, and igniting the resulting product in the presence of a gas mixture that is to be subjected to catalysis.

32. In the process of producing a catalyst containing a metal, the steps which comprise reacting a chemical compound containing a metal included in the fifth and sixth groups of the periodic system a chemical compound containing an organic dicarboxylic acid radical and ammonia, and igniting the resulting product.

33. In the process of producing a catalyst containing vanadium, the steps which comprise reacting a chemical compound containing vanadium, an organic compound containing an aliphatic dicarboxylic acid radical and ammonia, and igniting the resulting product.

34. In the process of producing a catalyst containing vanadium, the steps which comprise reacting an ammonium salt containing vanadium, an organic compound containing the oxalyl radical and ammonia, and igniting the resulting product.

35. In the process of producing a catalyst containing a metal, the process which comprises reacting a chemical compound containing vanadium with an organic compound containing the oxalyl radical, adding an excess of aqueous ammonia, and evaporating the solution until a sticky, amorphous product is obtained.

36. As an article of manufacture, an adherent catalyst containing a metallic element and obtained by igniting a metallic-organo complex containing a metal included in the fifth and sixth groups of the periodic system.

37. In the process of producing a catalyst containing a metal, the steps which comprise reacting a chemical compound containing the metal with a carboxylic acid, heating the reaction product with ammonia, and igniting the resulting product.

38. In the process of producing a catalyst containing a metal, the steps which comprise reacting a chemical compound containing the metal, an aliphatic carboxylic acid and ammonia, associating the resulting product with a catalyst carrier, and igniting the resulting product.

39. In the process of producing a catalyst containing a metal, the steps which comprise reacting a chemical compound containing the metal with an aliphatic polycarboxylic acid, heating the reaction product with ammonia, and igniting the resulting product.

40. In the process of producing a catalyst containing a metal, the steps which comprise reacting a chemical compound containing the metal, an aliphatic dicarboxylic acid and ammonia, associating the resulting product with a catalyst carrier, and igniting the resulting product.

41. A catalyzer comprising an adherent catalytic material formed by the production of a metallic-organo complex and the subsequent thermal decomposition of said complex upon the surface of a catalyst carrier.

42. A catalyzer comprising an adherent catalytic material formed by the production of a metallic-organo complex by reacting a compound containing a metal, a compound containing an acid radical of an organic carboxylic acid and ammonia, and subsequent thermal decomposition of the complex upon the surface of a catalyst carrier.

43. A catalyzer comprising an adherent catalytic material formed by the production of a metallic-organo complex by reacting a compound containing vanadium, a compound containing an acid radical of an organic carboxylic acid and ammonia, and subsequent thermal decomposition of the complex upon the surface of a catalyst carrier.

44. In the process of preparing a catalyst containing a metal, the step which comprises reacting a chemical compound containing the metal, an organic carboxylic acid and ammonia, and associating the resulting product with a catalyst carrier.

45. In the process of preparing a catalyst containing a metal, the step which comprises reacting a chemical compound containing the metal, an aliphatic polycarboxylic acid and ammonia, and associating the resulting product with a catalyst carrier.

46. In the process of preparing a catalyst containing a metal, the step which comprises reacting a chemical compound containing a metal included in the fifth and sixth groups of the periodic system with an aliphatic dicarboxylic acid and reacting the resulting product with ammonia.

47. In the process of preparing a catalyst containing a metal, the steps which comprise reacting a chemical compound containing a metal included in the group consisting of tantalum, cerium, thorium, zirconium, titanium, aluminum, chromium, molybdenum and vanadium with an organic carboxylic acid, reacting the resulting product with ammonia, and igniting the resulting product.

48. As an article of manufacture, an adherent catalyst containing a metal and obtained by igniting a metallic-organo complex containing ammonia and at least one metal of the group of metals whose oxides are not reducible by hydrogen.

49. As an article of manufacture, an adherent catalyst containing a metallic element and obtained by igniting a metallic-organo complex containing ammonia and a metal included in the group consisting of tantalum, cerium, thorium, zirconium, titanium, aluminum, chromium, molybdenum and vanadium.

50. In the process of producing a catalyst containing a metal, the steps which comprise reacting a chemical compound containing the metal with a chemical compound containing an acid radical of succinic acid, heating the reaction product with ammonia to produce a metallic-organo complex, and igniting the resulting metallic-organo complex.

51. A soluble, sticky, amorphous metallic-organo complex containing ammonia, a metal included in the fifth and sixth groups of the periodic system and an acid radical of succinic acid in chemical combination.

52. In the process of producing a catalyst containing a metal, the steps which comprise reacting a chemical compound containing the metal, a chemical compound containing an acid radical of maleic acid and ammonia, and igniting the resulting product.

53. A soluble, sticky, amorphous metallic-organo complex containing ammonia, a metal included in the fifth and sixth groups of the periodic system and an acid radical of maleic acid in chemical combination.

54. In the production of a vanadium oxide catalyst, the steps which comprise forming an intermediate for a catalyst by a process including reduction of a vanadic compound to vanadium tetroxide, associating the intermediate with a catalyst carrier, and igniting the resulting product.

55. In the process of producing a catalyst containing a metal, the steps which comprise evaporating a mixture of water, a catalyst carrier and a metallic-organo complex containing the metal in combination with a polycarboxylic acid of the aliphatic series and ammonia, and igniting the resulting product.

56. In the production of a vanadium catalyst, the steps which comprise forming an intermediate for a catalyst by a process including reduction of an oxygen-containing compound of pentavalent vanadium, associating the intermediate with a catalyst carrier, and igniting the resulting product.

57. In the production of a vanadium oxide catalyst, the steps which comprise forming a complex vanadium compound containing ammonia by a process including reducing an oxygen-containing compound of pentavalent vanadium, mixing the complex vanadium compound with a catalyst carrier in an aqueous medium, evaporating the resulting mixture, and igniting the resulting product.

In witness whereof I have hereunto set my hand.

AUGUSTUS E. CRAVER.